United States Patent [19]

Cowan et al.

[11] Patent Number: 5,322,124
[45] Date of Patent: Jun. 21, 1994

[54] SQUEEZE CEMENTING

[75] Inventors: Kenneth M. Cowan, Sugar Land; Arthur H. Hale, Houston, both of Tex.

[73] Assignee: Shell Oil Company, Houston, Tex.

[21] Appl. No.: 964,817

[22] Filed: Oct. 22, 1992

[51] Int. Cl.⁵ .............................................. F21B 33/13
[52] U.S. Cl. .................................. 166/295; 166/292; 166/293
[58] Field of Search ............... 166/285, 292, 293, 294, 166/295; 175/65, 66

[56] References Cited

U.S. PATENT DOCUMENTS

| | | |
|---|---|---|
| 2,336,723 | 12/1943 | Drummond . |
| 2,649,160 | 8/1953 | Williams et al. . |
| 2,822,873 | 2/1958 | Harmsen et al. . |
| 2,868,294 | 1/1959 | Beale, Jr. et al. ............... 166/292 |
| 2,880,096 | 3/1959 | Hurley . |
| 2,895,301 | 7/1959 | Casagrande et al. . |
| 2,899,329 | 8/1959 | Lyons . |
| 2,938,353 | 3/1960 | Vorenkamp . |
| 2,961,044 | 11/1960 | Shell . |
| 3,021,680 | 2/1962 | Hayward . |
| 3,077,740 | 2/1963 | Hemwall . |
| 3,111,006 | 11/1963 | Caron . |
| 3,168,139 | 2/1965 | Kennedy et al. . |
| 3,412,564 | 11/1968 | McClintock . |
| 3,499,491 | 3/1970 | Wyant et al. . |
| 3,557,876 | 1/1971 | Tragesser . |
| 3,670,832 | 6/1972 | Striegler . |
| 3,675,728 | 7/1972 | Faulk et al. . |
| 3,712,393 | 1/1973 | Sheldahl et al. . |
| 3,724,562 | 4/1973 | Striegler . |
| 3,820,611 | 6/1974 | King . |
| 3,835,939 | 9/1974 | McEntire . |
| 3,887,009 | 6/1975 | Miller et al. . |
| 3,962,878 | 6/1976 | Hansen . |
| 3,964,921 | 6/1976 | Persinski et al. . |
| 4,014,174 | 3/1977 | Mondshine . |
| 4,037,424 | 7/1977 | Anders . |
| 4,057,116 | 11/1977 | Striegler . |
| 4,215,952 | 8/1980 | Baardsen . |
| 4,252,471 | 2/1981 | Straub . |
| 4,335,980 | 6/1982 | DePriester . |
| 4,338,134 | 7/1982 | Graf zu Munster . |
| 4,425,055 | 1/1984 | Tiedemann . |
| 4 427,320 | 1/1984 | Bhula . |
| 4,450,009 | 5/1984 | Childs et al. . |
| 4,460,292 | 7/1984 | Durham et al. . |

(List continued on next page.)

FOREIGN PATENT DOCUMENTS

| | | |
|---|---|---|
| 85-144069/24 | 7/1983 | Japan . |
| 61-48454 | 3/1986 | Japan . |
| 833704 | 6/1981 | U.S.S.R. . |

OTHER PUBLICATIONS

"Deep Cement Mixing Experience in Japan", by G. Dennis et al, Copyright 1985 Seabed Strengthening Symposium, Denver, Colo., Jun. 4, 1985, TP 85-5.

"Mud Disposal: An Industry Perspective", Hanson et al, Drilling, May 1986, pp. 16–21.

"Waste Minimization Program Can Reduce Drilling Costs", Hall et al, Oryx Energy Co., Houston, Tex., Oil & Gas Journal, Jul. 1, 1991, pp. 43–46.

"Phosphoric Acids and Phosphates", Kirk-Othmer Enc. of Chemical Technology, 3rd Ed., vol. 17, p. 477.

"Conversion of Drilling Fluids to Cements with Blast Furnace Slag-Performance Properties and Applications for Well Cementing", SPE Paper 24575 (Oct. 4, 1991) by Cowan et al.

"Quantitative Interpretation of X-Ray Diffraction Patterns of Mixtures.I.Matrix-Flushing Method for Quantitative Multicomponent Analysis" by Frank H. Chung, J. Appl. Cryst. (1974) 7, pp. 519–525.

Primary Examiner—George A. Suchfield

[57] ABSTRACT

Squeeze cementing is conducted using non-conventional cements such as blast furnace slag—water base drilling fluid mixtures which are not adversely affected by brine or pockets of gelled drilling fluid beneath the primary cement.

4 Claims, No Drawings

U.S. PATENT DOCUMENTS

| | | | |
|---|---|---|---|
| 4,518,508 | 5/1985 | Conner | 210/751 |
| 4,643,617 | 2/1987 | Kanno et al. | 405/222 |
| 4,664,843 | 5/1987 | Burba, III et al. | |
| 4,668,128 | 5/1987 | Hartley et al. | |
| 4,674,574 | 6/1987 | Savoly et al. | 166/293 |
| 4,690,589 | 9/1987 | Owa | 405/263 |
| 4,692,065 | 9/1987 | Suzuki et al. | 405/211 |
| 4,720,214 | 1/1988 | Brasted et al. | |
| 4,746,245 | 5/1988 | Mork | 405/224 |
| 4,760,882 | 8/1988 | Novak | |
| 4,761,183 | 8/1988 | Clarke | |
| 4,790,954 | 12/1988 | Burba, III et al. | |
| 4,880,468 | 11/1989 | Bowlin et al. | |
| 4,897,119 | 1/1990 | Clarke | |
| 4,913,585 | 4/1990 | Thompson et al. | |
| 4,942,929 | 7/1990 | Malachosky et al. | |
| 4,991,668 | 2/1991 | Rehm et al. | |
| 5,016,711 | 5/1991 | Cowan | |
| 5,020,598 | 6/1991 | Cowan et al. | 166/293 |
| 5,026,215 | 6/1991 | Clarke | |
| 5,058,679 | 10/1991 | Hale et al. | |
| 5,082,499 | 1/1992 | Shen | 106/735 |
| 5,086,850 | 2/1992 | Harris et al. | |
| 5,105,885 | 4/1992 | Bray et al. | |
| 5,106,423 | 4/1992 | Clarke | |
| 5,121,795 | 6/1992 | Ewert et al. | |
| 5,123,487 | 6/1992 | Harris et al. | |
| 5,125,455 | 6/1992 | Harris et al. | |
| 5,127,473 | 7/1992 | Harris et al. | |
| 5,133,806 | 7/1992 | Sakamoto et al. | 106/811 |
| 5,147,565 | 9/1992 | Bour et al. | 252/8.551 |

SQUEEZE CEMENTING

FIELD OF THE INVENTION

This invention relates to the injection of cement slurries into the casing/wellbore annular space of a well, especially an oil or gas well, and particularly through casing perforations or splits in damaged sections of the well.

BACKGROUND OF THE INVENTION

Squeeze cementing is the process of forcing a cement slurry through holes or splits in a casing/wellbore annular space of a well in order to repair a primary cement job that failed due to the cement bypassing the mud (channeling); to eliminate water intrusion from above, below or within the hydrocarbon-producing zone; to reduce the producing gas to oil ratio by isolating gas zones from adjacent oil intervals; to repair casing leaks due to a corroded or split pipe; to plug all, or part, of one or more zones in a multizone injection well so as to direct the injection into the desired intervals; and to plug and abandon a depleted or watered-out producing zone.

Due to high pressures involved, squeeze cementing is beset with many problems such as propagating fractures. In addition, the use of Portland cement has several potential problems of its own, particularly where high strength and good adhesion to the borehole wall are needed in order to effect good sealing. The presence of drilling mud pockets on channels under the primary cement not only can lead to failure of the primary cement job, but can adversely affect the strength of the squeeze cementing job. In addition, the presence of brine in the well can adversely affect both the primary and remedial cement jobs, increasing setting time and causing loss of strength of the cement.

Accordingly, the present invention is directed to overcoming the above-noted problems with Portland cement used for squeeze cementing.

SUMMARY OF THE INVENTION

It is the primary purpose of the present invention to provide a method for squeeze cementing a well.

Accordingly a method is provided for forcing a cement slurry through holes or splits in a casing/wellbore annular space of a well, comprising:

preparing a cementitious slurry comprising:

(a) a cementitious component selected from blast furnace slag and a proton acceptor metal compound and (b) an activator wherein, when said cementitious component is said blast furnace slag, said activator is optionally an alkaline agent, and when said cementitious component is said metal compound, said activator is a phosphorus acid or one of a polymer component of the formula:

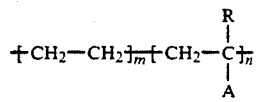

wherein A is

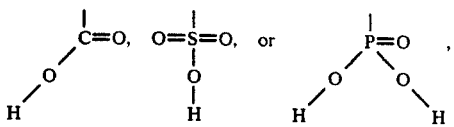

or a mixture of

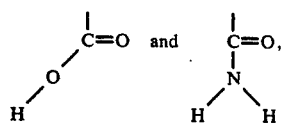

and wherein R is H or a 1-10 carbon atom alkyl radical and the ratio of m to n is within the range of 0:1 to 100:1.

(c) a water source selected from water, brine, seawater, water base drilling fluid, and water emulsion drilling fluid displacing the slurry through said holes or splits; and allowing the slurry to solidify to a remedial cement in situ.

Other purposes, distinctions over the art, advantages and features of the invention will be apparent to one skilled in the art upon review of the following.

DESCRIPTION OF PREFERRED EMBODIMENTS

The following preferred embodiments of the invention explain the principles of the invention.

The present invention provides a unique method devised to permit squeeze cementing of wells in the presence of drilling fluids and brine without adversely affecting the cement.

In accordance with the present invention it has been found that certain non-conventional cements not only are not adversely affected by drilling fluids, but can be admixed with water base drilling fluid or emulsion drilling fluid to form a squeeze cementing slurry. In a preferred embodiment, blast furnace slag—drilling fluid cement is not only not affected by brine, but is significantly strengthened by admixture with brine, as shown hereinafter.

Squeeze cementing generally falls into two classifications depending on the way the cement is placed behind the casing. In low pressure squeezing, cement slurry is forced through the perforations at pressures below the formation fracturing pressure. The hydrostatic pressure caused by the long column of cement slurry will, in most cases, break down the formation. Once the fracture is open, only its propagation pressure must be overcome to allow the cement to be pumped into the fracture.

There are some cases where low pressure squeezing of perforations will not accomplish the objective of the job. Channels behind the casing may not be connected directly with perforations; small cracks or microannuli may permit the flow of gas but not of a cement slurry. Under these conditions, high pressure squeezing is used to break down formations at, or close to, the perforations. A horizontal fracture will be created if fracturing pressure is greater then overburden pressure; a vertical fracture will occur if overburden pressure is the greater.

There are two general ways of performing a squeeze job and the difference lies in the use, or not, of isolating tools. Packer squeeze techniques rely upon the isolation of the casing and the wellhead while high pressure is applied downhole. Retrievable packers are used which have a bypass valve to allow the circulation of fluids during the setting of the packer. Drillable bridge plugs are used to isolate the casing below the zone to be treated.

The Bradenhead squeeze technique is used mainly when low pressure squeezing is practical and there are no doubts about the casing's capacity to withstand the squeeze pressures. There are no special tools involved, besides the bridge plug to isolate downhole formations. Open-ended tubing is run to the bottom of the zone to be cemented. BOP rams are closed over the tubing and an injection test conducted. The cement slurry is subsequently spotted in front of the perforations. Once the cement is in place, the tubing is withdrawn to a point above the cement top, preventors are closed and pressure is applied through the tubing.

The most common reason for high or low pressure squeezing failure is plugged perforations. To solve this problem, a wash fluid is pumped down the tubing, forced into the holes, then outside the casing and back through higher perforations into the annulus. Acidizing perforations with hydrochloric or hydrofluoric acid solutions is another effective method of removing acid soluble materials.

A major concern related to the success of cement placement is avoiding contamination of the Portland cement slurry with wash fluids and acids. Slurry properties, such as fluid loss, thickening time and viscosity, can be modified by contact of the Portland cement with completion fluids. A small quantity of Portland cement slurry, having high fluid loss or high viscosity, may readily block channels and prevent slurry placement. Water spacers ahead and behind the Portland cement slurry may partially protect it, but the water spacers also have an unfavorable effect on the Portland cement slurry. The non-conventional cements of the present invention are not significantly affected by completion and do not require water spacers.

In this description the term ,cementitious material, means either an hydraulic material which on contact with water and/or activators hardens or sets into a solidified composition or a component which, on contact with a reactive second component, sets or hardens into a solidified composition. Thus, broadly it can be viewed as a material which can chemically combine to form a cement. A slurry of the cementitious material and the component or components which cause it to harden is referred to herein as a cementitious slurry. The term 'pipe' means a casing or liner.

Drilling Fluids

The drilling fluid or mud can be either a conventional drilling fluid, i.e., one not containing a cementitious material, or it can be one already containing a cementitious material in a relatively small amount. The drilling fluid can be either a water-based fluid or an oil-based fluid. The term 'water-based fluid' is intended to encompass both fresh water muds, salt water containing muds, whether made from seawater or brine, and other muds having water as the continuous phase including oil-in-water emulsions. In any event drilling fluid will always contain at least one additive such as viscosifiers, thinners, dissolved salts, solids from the drilled formations, solid weighting agents to increase the fluid density, formation stabilizers to inhibit deleterious interaction between the drilling fluid and geologic formations, and additives to improve the lubricity of the drilling fluid.

It is generally preferred that the water-based drilling fluids use water containing dissolved salts, particularly sodium chloride. In these instances, 0 to saturation, preferably 0.5 to 20, more preferably 3.0 to 10 wt % sodium chloride may be used. One suitable source is to use seawater or a brine solution simulating seawater. Particularly in the embodiment using slag, the strength of the resulting cement is actually enhanced which is contrary to what would be expected in view of the intolerance of Portland cement to brine. Various salts, preferably organic salts, are suitable for use in the drilling fluid used in this invention in addition to, or instead of NaCl, including, but not limited to, NaBr, KCl, $CaCl_2$, $NaNO_3$, $NaC_2H_3O_2$, $KC_2H_4O_2$, $NaCHO_2$ and $KCHO_2$ among which sodium chloride is preferred, as noted above. The term 'oil-based fluids' is meant to cover fluids having oil as the continuous phase, including low water content oil-base mud and invert oil-emulsion mud.

A typical mud formulation to which cementitious material may be added to form drilling fluid is as follows: 10-20 wt % salt, 8-10 lbs/bbl bentonite, 4-6 lbs/bbl carboxymethyl starch (fluid loss preventor), sold under the trade name "BIOLOSE" by Milpark, 0.5-1 lbs/bbl partially hydrolyzed polyacrylamide (PHPA) which is a shale stabilizer, sold under the trade name "NEWDRIL" by Milpark, 1-1.25 lbs/bbl CMC sold under the trade name "MILPAC" by Milpark, 30-70 lbs/bbl drill solids, and 0-500 lbs/bbl barite.

Non-Conventional Cements

The cementitious component can be any one or more of: conventional hydraulic cement, natural or artificial pozzolan, or the metal compound used to produce an ionomer or to produce a phosphorus salt. The preferred cementitious material is one selected from the group consisting of blast furnace slag, a metal compound which is a proton acceptor component used to produce the ionomer and a metal compound which is a proton acceptor component used to produce the phosphorus salt. By 'blast furnace slag' is meant the hydraulic refuse from the melting of metals or reduction of ores in a furnace as disclosed in Hale and Cowan, U.S. Pat. No. 5,058,679 (Oct. 22, 1991), the disclosure of which is hereby incorporated by reference. By 'phosphorus salt' is meant a phosphonate, a phosphate or a polyphosphate as is described in detail hereinafter.

The preferred blast furnace slag used in this invention is a high glass content slag produced by quickly quenching a molten stream of slag at a temperature of between 1400° C. and 1600° C. through intimate contact with large volumes of water. Quenching converts the stream into a material in a glassy state having hydraulic properties. At this stage it is generally a granular material that can be easily ground to the desired degree of fineness. Silicon dioxides, aluminum oxides, iron oxides, calcium oxide, magnesium oxide, sodium oxide, potassium oxide, and sulphur are some of the chemical components in slags. Preferably, the blast furnace slag used in this invention has a particle size such that it exhibits a Blaine specific surface area between 2000 $cm^2/g$ and 15,000 $cm^2/g$ and more preferably, between 3,000 $cm^2/g$ and 15,000 $cm^2/g$, even more preferably, between 4,000 $cm^2/g$ and 9,000 $cm^2/g$, most preferably between 4,000 $cm^2/g$ and 8,500 $cm^2/g$. An available blast furnace slag which fulfills these requirements is marketed under the trade name "NEWCEM" by the Blue Circle Cement Company. This slag is obtained from the Bethlehem Steel Corporation blast furnace at Sparrows Point, Md.

A usual blast furnace slag composition range in weight percent is: SiO₂, 30–40; Al₂O₃, 8–18; CaO, 35–50; MgO, 0–15; iron oxides, 0–1; S, 0–2 and manganese oxides, 0–2. A typical specific example is: SiO₂, 36.4; Al₂O₃, 16.0; CaO, 43.3; MgO, 3.5; iron oxides, 0.3; S, 0.5; and MnO₂O₃<0.1.

Blast furnace slag having relatively small particle size is frequently desirable because of the greater strength it imparts in many instances to a final cement. Characterized in terms of particle size the term "fine" can be used to describe particles in the range of 4,000 to 7,000 cm²/g Blaine specific surface area. Corresponding to 16 to 31 microns in size; "microfine" can be used to describe those particles in the 7,000 to 10,000 cm²/g Blaine specific surface area range that correspond to particles of 5.5–16 microns in size and "ultrafine" can be used to describe particles over 10,000 cm²/g Blaine specific surface area that correspond to particles 5.5 microns and smaller in size.

However, it is very time consuming to grind blast furnace slag to these particles sizes. It is not possible to grind blast furnace slag in a manner where particles are entirely once size. Thus, any grinding operation will give a polydispersed particle size distribution. A plot of particle size versus percent of particles having that size would thus give a curve showing the particle size distribution.

In accordance with a preferred embodiment of this invention a blast furnace slag having a polydispersed particle size distribution exhibiting at least two nodes on a plot of particle size versus percent of particles in that size is utilized. It has been found that if only a portion of the particles are in the ultrafine category, the remaining, indeed the majority, of the slag can be ground more coarsely and still give essentially the same result as is obtained from the more expensive grinding of all of the blast furnace slag to an ultrafine state. Thus, a grinding process which will give at least 5% of its particles falling within a size range of 1.9 to 5.5 microns offers a particular advantage in economy and effectiveness. More preferably, 6 to 25 wt % would fall within the 1.9 to 5.5 micron range. The most straightforward way of obtaining such a composition is simply to grind a minor portion of the blast furnace slag to an ultrafine condition and mix the resulting powder with slag ground under less severe conditions. Even with the less severe conditions there would be some particles within the fine, microfine or ultrafine range. Thus, only a minority, i.e., as little as 4 wt % of the slag, would need to be ground to the ultrafine particle size. Generally, 5 to 20 wt %, more preferably 5 to 8 wt % can be ground to the ultrafine particle size and the remainder ground in a normal way thus giving particles generally in a size range of greater than 11 microns, the majority being in the 11 to 31 micron range.

By ionomer is meant organometal compositions having a metal attached to or interlocking (crosslinking) a polymer chain. Suitable polymer components of such ionomers can be represented by the formula

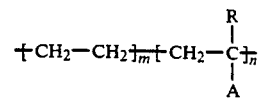

wherein A is

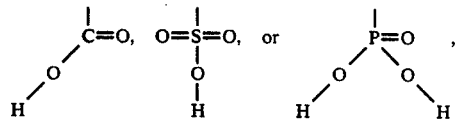

or a mixture of

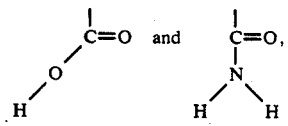

and wherein R is H or a 1–10 carbon atom alkyl radical. The ratio of m to n is generally within the range of 0:1 to 100:1, preferably 0.1:1 to 10:1.

The polymers generally have a ratio of functional groups to polymer chain carbons within the range of 1:2 to 1:10, preferably about 1:3. Thus, if m and n are 1, R is H and A is carboxylate, there would be a ratio of carboxylic carbons (1) to polymer chain carbons (4) of 1:4. The polymer can also be a polycarboxylic acid polymer. One such polymer is that made from partially hydrolyzed polyacrylamide. The hydrolysis can vary from 1% up to 100% and preferably from 10% to 50%, most preferably from 25% to 40%. The molecular weight of the polymers can vary widely so long as the polymers are either water-soluble or water-dispersable. The weight average molecular weights can range from 1000 to 1,000,000 but preferably will be in the range of 1,000 to 250,000, most preferably 10,000 to 100,000. Carboxylate polymer with a low ratio of COOH:C within the range of 1:3 to 2:5 are preferred. Especially preferred is a carboxylic acid polymer having a ratio of carboxylic carbons to polymer chain carbons (including carbons of pendant chains) of about 1:3 and a molecular weight within the range of 10,000 to 100,000. Partially hydrolyzed polyacrylamide polymers in the range of 5,000–15,000,000 molecular weight are suitable. The copolymers will generally have from 2–99, preferably 5–80, more preferably 10–60 mole percent acid-containing units.

The poly(carboxylic acid) component can be any water soluble or water dispersable carboxylic acid polymer which will form ionomers. Ionomer forming polymers are well known in the art. Suitable polymers include poly(acrylic acid) poly(methacrylic acid), poly(ethacrylic acid), poly(fumaric acid), poly(maleic acid), poly(itaconic acid) and copolymers such as ethylene/acrylic acid copolymer and ethylene/methacrylic acid copolymer. The copolymers are generally random copolymers. An example of phosphonic acid polymers is poly(vinyl phosphonic acid) which is made from vinyl phosphonic acid,

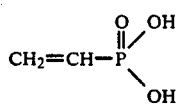

Suitable copolymers containing vinyl phosphonic acid include vinyl phosphonic acid/acrylic acid copolymer as well as copolymers with other unsaturated monomers, with or without a functional group.

In some instances, it is preferred to use water dispersable, as opposed to water soluble, polymers. Ideally, in such instances the melting point of the polymer should be higher than the placement temperature (circulating temperature) in the wellbore during the "cementing" operation and lower than the maximum, static temperature of the surrounding formations. It is desirable for the polymer to melt and react after placement as the temperature in the wellbore increases from the circulating temperature to the static temperature of the surrounding formations.

The ionomers suitable for use in this invention are the water-insoluble reaction product of a proton acceptor metal compound which serves as the cementitious component and a carboxylic, sulfonic, or phosphonic acid polymer component. The metal compound generally is a metal oxide such as CaO, MgO or ZnO. The preferred metal oxides are magnesium oxide and zinc oxide, and most preferably, magnesium oxide. The applicable metal oxides are generally fired at temperatures above 1,000° F. for several hours to reduce chemical activity prior to grinding to final particle size for use in reacting with the acid component.

In instances where it is desired that the metal compound component add weight to the drilling fluid, the metal compound is preferably a water-insoluble metal compound with a specific gravity of at least 3.0, preferably 3.5. By 'insoluble' is meant that less than 0.01 parts by weight dissolve in 100 parts by weight of cold (room temperature) water.

The particle size of the metal compound component can vary widely. Generally, it will be within the range such that the powder exhibits a surface area within the range of 500 cm$^2$/g to 30,000 cm$^2$/g, preferably 1,500 cm$^2$/g to 25,000 cm$^2$/g, most preferably 2,000 cm$^2$/g to 20,000 cm$^2$/g.

The amount of polymer utilized will vary widely depending upon the carboxylic acid content of the polymer; broadly, 10 to 200, preferably 10 to 100, most preferably 10 to 80 wt %, based on the weight of metal compound, can be present. With the polymers having a low ratio of m to n, a smaller amount is required because of the higher functional group content of the polymer. Conversely, with the high ratio of m to n, an amount of polymer toward the higher end of the ranges is preferred. Polymers with ester groups can be used to retard or delay the setting of the ionomer cement as desired.

Phosphates and phosphonates, referred to herein as phosphorus salts, used in accordance with this invention also are produced from a two-component composition, the first component of which is a metal compound identical in scope to that used in the ionomers as described hereinabove so long as the resulting phosphorus salt is insoluble in water. Most preferred are CaO, MgO and ZnO.

The second component is a phosphonic or phosphoric acid, preferably a polyphosphoric acid. The term 'phosphoric acid' is meant to encompass both linear and cyclic polyphosphoric acids. These second component acids are referred to herein as phosphorus acids. Linear phosphoric acids can be depicted by the general formula $H_{n+2}P_nO_{3n+1}$ where n is 1 to 100, preferably 2 to 50, more preferably, 2 to 20. Examples include di-(pyro)phosphoric acid, tri-(tripoly)phosphoric acid, tetra-phosphoric acid and higher molecular weight polyphosphoric acids as well as phosphoric acid. Mixtures of acids, including those traditionally referred to as meta phosphoric acid, are particularly suitable for use in this invention.

The formation of one phosphate cement using a metal oxide as the metal compound can be depicted as follows:

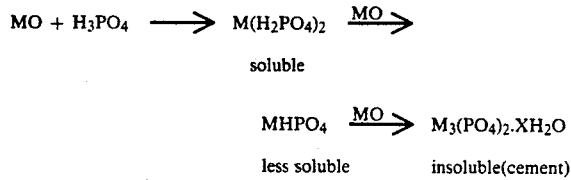

where:

X is usually 4; and

MO = metal oxide which is amphoteric or is a proton acceptor.

The phosphorus acid component is used in a stoichiometric amount or less since an excess of acid should generally be avoided. From to 10 or even to 50 mole percent less than a stoichiometric amount is suitable. Generally, a stoichiometric amount will be between 10 and 100 wt % based on the weight of the metal compound. Boric acid, borate salts, and aluminates such as sodium aluminate can be used to retard or delay the setting of the phosphate cement. Amounts of 1–100% by weight, based on the weight of the phosphorus acid, are effective to retard the setting of the phosphate cement.

With the ionomers, and the phosphorus salts when made with a polyvalent metal compound, a crosslinked network structure exists as a result of the addition of the second component, thus giving a very strong solid cement.

Because of the mass provided by the metal compound component of the ionomer or the polyphosphorus salt, these cementitious materials are generally actually heavier than most slag or Portland cement materials. In the embodiments using these cementitious materials this high density provides significant advantages in certain utilities. For one thing, a smaller amount of the material can be used and still achieve a final mud and ultimately cement of a desired density. Secondly, because of the high density, it is possible to operate without weighting agents such as barium sulfate or barite. They offer a further advantage in that they do not set up until the second component is added.

The metal compound of the ionomer or phosphorus salt can be used as the sole cementitious material or can be used in admixture with siliceous hydraulic materials such as the blast furnace slag or Portland cement. In one embodiment an hydraulic component such as slag can be used to give the metal ion component of the ionomer or phosphate to give, in effect, a mixture formed in situ.

Preferably, when the ionomer or phosphorus salt is utilized, the metal compound is added first and thereafter at such time as it is desired for the cement to be activated to set, the other component is added. In the case of the universal fluids, a portion of the total metal compound can be added to the drilling fluid, the remainder being added after dilution when the cementitious slurry is being formed.

The sequence for the universal fluid embodiment of this invention is to prepare the drilling fluid containing a portion of the total slag or metal compound to be utilized, carry out the drilling operation, dilute the fluid, add the remainder of the slag or metal compound, and thereafter add the activator or acid components and utilize the cement for its intended purpose such as cementing a casing.

In accordance with the invention that utilizes universal fluid, the fluid itself becomes a part of the final cement and thus, this portion of the drilling fluid does not need to be disposed of.

In all embodiments of the invention, additional cement can be made and used, in accordance with this invention, for remedial cementing.

The ionomer embodiments of this invention are of particular value for filling and sealing the annulus between a borehole wall and a casing, or between casings, particularly where some degree of ductility and/or tensile strength is desired. The ionomer has good adhesive properties to the borehole wall and casing and has greater elasticity than is obtained with siliceous hydraulic materials such as Portland cement. Thus, such cements are resistant to cracking under conditions of cyclic loading as are frequently encountered in a wellbore. For similar reasons the ionomer embodiment of the invention is beneficial in cementing liners and tieback casing strings which may otherwise leak due to changes in pressure and temperature in the well during production operations. Another area where the ductility of the ionomer cement is of special value is in slim hole wells where the annulus is smaller. Still yet another area where this ductility is important is in extended reach drilling. The term 'extended reach' is intended to cover horizontal drilling and any other well drilling operations which are off-vertical a sufficient amount to cause the casing to be displaced by gravity toward one side of the borehole.

As noted hereinabove the initial drilling fluid can be either a conventional drilling fluid or it can be a universal fluid which already has cementitious material therein.

Dilution

In all embodiments, the amount of dilution can vary widely depending on the desired application. Generally, the fluid will be diluted with from 5 to 200 by volume, preferably 5 to 100% by volume, more preferably 5 to 50% by volume of liquid (water in the case of a water-based fluid) based on the volume of initial drilling fluid. In one particularly preferred embodiment, the dilution is such that on addition of the cementitious component (or in the case of the universal fluid addition of the remaining cementitious component) the final density will be within the range of 30% less to 70% more than the original density, preferably within the range of 15% less to 50% more, most preferably, essentially the same, i.e., varying by no more than ±5 wt %. This is particularly valuable in an operation where there is a narrow pressure window between the pressure needed to prevent blowout and the pressure which would rupture or fracture the formation through which drilling has taken place.

The dilution fluid can be the same or different from that used to make the drilling fluid in the first place. In the case of brine-containing fluids the dilution fluid will generally be brine also. This is of particular benefit in offshore drilling operations where fresh water is not readily available but brine is since seawater is a desirable brine.

Thus, as noted above, a significant improvement in the operating procedure is provided in accordance with this invention. This is because the density of the drilling fluid is frequently tailored to the characteristics of the formation through which the wellbore is being drilled. Thus, the density is chosen in the first place to be sufficient to avoid inflow into the wellbore because of formation pressure but is further chosen to be insufficient to rupture or fracture the borehole wall and force the fluid out into the formation. By utilizing the dilution and thereafter addition of the cementitious component (or in the case of universal fluid, the remainder of the cementitious component) the cementitious slurry can likewise have a density tailored to the particular operation. In addition, this avoids undue thickening of the drilling fluid as would occur, particularly with some hydraulic components, without the dilution and thus the rheological properties of the cementitious slurry and the drilling fluid can both be tailored for optimum performance.

The invention (dilution of a drilling fluid and thereafter adding cementitious material to produce a cementitious slurry) offers special advantages with certain cementitious components in addition to the general benefits such as reduced equipment needs. With Portland cement it reduces the extraordinary viscosity increase that adding such an hydraulic material to a drilling fluid would give. With slag, organometals and polyphosphates there is the advantage that the cementitious component has a drilling fluid function. With the ionomers and polyphosphates there is the further general advantage that unlimited time can elapse between the drilling and cementing operations with no loss of properties of either because these materials do not begin to set until the second component is added.

The dilution can be carried out in either of two ways. First, a vessel containing drilling fluid can simply be isolated and the desired amount of water or other diluent added thereto. In a preferred embodiment, however, the drilling fluid is passed to a mixing zone as a flowing stream and the dilution fluid added "on the fly" to the flowing stream. Thereafter the additional blast furnace slag is added. This avoids highly viscous cementitious slurry compositions and allows all of the pumping to be done with piping and pumps associated with the well rig without the need for pumps designed for pumping cement. This is of particular value in the areas to which this invention is of special utility, offshore drilling rigs where the transportation of additional pumping equipment is particularly inconvenient. Thus, it is possible to tailor the final density of the cementitious slurry, if desired, to a value within the range of 30% less to 70% more than the original density of the drilling fluid, preferably within the range of 15% less to 50% more, most preferably essentially the same, i.e., varying by no more than ±5 weight percent.

Surfactants, alcohols, or blends thereof may be used in the drilling fluids of this invention to improve bonding.

Bonding Surfactants

The surfactants may be anionic, amphoteric, cationic, nonionic or blends thereof, e.g., nonionics with anionic or cationic surfactants.

The following surfactants, classes of surfactants, and mixtures of surfactants are particularly useful in the present invention:

1. Alkanol amides (nonionic):

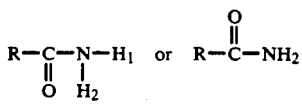

where R = a carbon chain (alkyl group) of 8–20 carbons (usually 10–18); $H_1$ and/or $H_2$ may be replaced by an alkanol such as ethanol or isopropanol. One or both of the H's may be replaced.

Examples: lauric monoisopropanol amide, lauric diethanol amide, coconut diethanol amide. "ALKAMIDE 2106®" by Alkaril Chemicals, Ltd. is a coconut diethanol amide suitable for this application.

2. Ethoxylated alkyl aryl sulfonate:

Examples: nonyl phenol sulfonate with 8 moles ethylene oxide, and N-decyl benzene sulfonate with 6 moles ethylene oxide.

3. Amine oxides (nonionic):

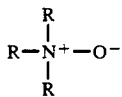

where R = alkyl carbon chains from 1 to 20 carbons, usually one chain is 10 to 18 carbons. Alkyl groups can have hydroxyl or amido functional groups in their chain.

Examples: bis(2-hydroxyethyl) coco amine oxide, bis(2-hydroxyethyl) laurel amine oxide, laurel dimethyl amine oxide, coco amidopropyl dimethyl amine oxide, cetyl dimethyl amine oxide, myristyl dimethyl amine oxide.

4. Betaines and Betaine Derivatives

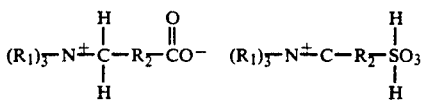

where $R_1$ = alkyl chain length between 3 and 20 carbons, $R_2$ = alkyl chain length between 1 and 4 carbons. Amide functional groups may be incorporated into the $R_1$ alkyl chain.

Examples: coco amido propyl betaine ($R_2$ = propyl group 3 carbons), laurel betaine ($R_1$ = laurel group of 12 carbons, no $R_2$), coco betaine ($R_1$ = coco group of 12–14 carbons, no $R_2$), oleyl betaine ($R_1$—oleyl group of 18 carbons, no $R_2$), myristic betaine ($R_1$ = myristyl group of 14 carbons, no $R_2$), oleamido propyl betaine, isostearamido propyl betaine, laurel sulfobetaine.

5. Ethoxylated Alcohols (nonionic):

Ethoxylated simple alcohols with linear or branched chains having between 8 and 20 carbons with 3 to 20 mole of ethylene oxide groups; 6–14 moles of ethylene oxide are typical.

Examples: $C_9$–$C_{11}$ linear alcohol with 8 moles ethylene oxide, $C_{14}$–$C_{15}$ linear alcohol with 13 moles ethylene oxide, $C_{12}$–$C_{15}$ linear alcohol with 9 moles ethylene oxide.

6. Sulfates and Sulfonates of Ethoxylated Alcohols (anionic):

The same ranges apply as in No. 5 supra except ethylene oxide moles may vary between 2 and 14.

Examples: $C_{12}$–$C_{13}$ linear alcohol sulfate or sulfonate with 3 moles ethylene oxide, $C_{12}$–$C_{15}$ linear alcohol sulfate or sulfonate with 3 moles ethylene oxide.

7. Ethoxylated Alkyl Phenols (nonionic):

Alkyl chains of 8 to 20 carbons, usually between 4 and 14 carbons and more preferred to be 8 or 9 carbons, with 4–20 moles of ethylene oxide, usually between 7 and 20 moles and more preferred to 8–12 moles.

Examples: Nonylphenol with 9 moles ethylene oxide, octylphenol with 8 moles ethylene oxide.

Sulfates or Sulfonates of Ethoxylated Alkyl Phenols (and their salts) (anionic)

Examples: Nonyl phenol sulfate or sulfonate with 9 moles ethylene oxide; octyl phenol sulfate or sulfonate with 8 moles ethylene oxide.

9. Fluorocrabon-based Surfactants (nonionic, amphoteric, anionic):

These must be water-soluble forms. Fluorocarbon esters such as 3M Company's "FC-740" are oil soluble and not appropriate for this use. 3M Company's "FC-100", "FC-129", "FC-170C" are commercially available examples of fluorocarbon-based surfactants used in the invention.

Examples: Fluoro-octyl sulfonate or sulfate, perfluorated quaternary ammonium oxide, and fluorinated $C_9$–$C_{11}$ alcohols with 7 moles ethylene oxide.

10. Phosphate Derivatives of Ethoxylated Alcohols:

Examples: $C_{14}$–$C_{16}$ linear alcohols phosphate with 8 moles ethylene oxide; phosphated nonylphenol with 10 moles ethylene oxide.

11. Quaternary Ammonium Chloride (cationic):

Dimethyl dicoco ammonium chloride, cetyl dimethyl benzyl ammonium chloride, cetyl dimethyl ammonium chloride.

12. Sulfates or Sulfonates of Alcohols (and their salts)(Anionic):

Sulfated simple alcohols with carbon chains of 8–20, usually between 10 and 16 and most common 10–12.

Examples: Sodium lauryl sulfate or sulfonate, potassium lauryl sulfate or sulfonate, magnesium lauryl sulfate or sulfonate, sodium n-decyl sulfate or sulfonate, triethanol amine laurel sulfate or sulfonate, sodium 2-ethylhexyl sulfate or sulfonate.

13. Condensation Products of Ethylene Oxide and Propylene Glycol (nonionic):

Examples: Propoxylated $C_9$–$C_{14}$ alcohols with 6 moles ethylene oxide.

The surfactants or mixtures of surfactants should be soluble in the cementitious slurry and not precipitate or otherwise degrade under the action of the ions in the cementitious slurry (e.g., resistant to calcium and other electrolytes) and the temperature and pressure conditions occurring during the placement and curing of the cement.

Especially preferred are nonylphenol ethoxylates, coco amido betaine, blends of N-alkyl coco trimethyl ammonium chloride and bis(2-hydroxyethyl) cocoamide oxide, blends of ethoxylated trimethylnonanol and perfluoro quaternary ammonium oxide, $C_{12}$–$C_{15}$ linear alcohol ethoxylate sulfate, $C_9$–$C_{11}$ linear alcohol ethoxylate sulfates, sodium lauryl sulfate, and ethoxy alcohol sulfates.

The concentration of surfactant in the water phase used to prepare the slurry will generally be from about 0.1 to about 5% by weight, and more preferably from about 0.2 to about 3% by weight; excellent results have been obtained with concentrations between about 1.17 and about 2.33% by volume.

Alcohols

The invention is very effective for solidification of drilling fluids containing polyhydric alcohols. The following alcohols may be used alone or in blends with the preceding surfactants. The polyalcohol ingredients of drilling fluids containing polyalcohols are preferably acyclic polyols having at least two carbon atoms and 2 hydroxyl groups but no more than 18 carbon atoms and 13 hydroxyl groups. Preferably, the polyols of the invention have at least 2 carbon atoms and 2 hydroxyl groups, but no more than 9 carbon atoms and 7 hydroxyl groups.

Nonlimiting examples of such polyols include (carbons chains may be straight or branched), ethylene glycol, diethylene glycol, 1,2-propanediol, 1,3-propanediol (propylene glycol), neopentyl glycol, pentaerythritol, 1,6-hexanediol, glycerol, telomers of glycerol such as diglycerols, triglycerols, tetraglycerols, pentaglycerols, and hexaglycerols, mixtures of glycerol and telomers of glycerol such as diglycerol and triglycerols, mixtures of telomers of glycerol, polyethylene glycols, polypropylene glycols, ethylenepropylene glycol, polyethylenepropylene glycols, ethylene-propylene glycol copolymers and ethylenebutylene glycol copolymers, 1,5,6,9-decanetetrol, 1,1,4,4-cyclohexanetetramethanol, 1,2,4,5-cyclohexanetetramethanol, 1,4-cyclohexanedimethanol, 1,3-cyclopentanedimethanol, 1,2,4,7-heptanetetrol, 1,2,3,5-heptanetetrol, 1,5,8-nonanetriol, 1,5,9-nonanetriol, 1,3,5,9-nonanetetrol, 1,3,5-heptanetriol, 2,4,6-heptanetriol, 4,4-dimethyl-1,2,3-pentanetriol, 1,1,3-cyclohexanetrimethanol, 1,3,4-cycloheptanetriol, 1,1-cyclopropanediol, 1,2-cyclopropanediol, 1,2,3-cyclopropanetriol, 1,1-cyclopropanedimethanol, 1,2-cyclopropanedimethanol, 1,2,3-cyclopropanedimethanol, 1,1-cyclobutanediol, 1,2-cyclobutanediol, 1,3-cyclobutanediol, 1,2-cyclobutanedimethanol, 1,2,3-cyclobutanetriol, 1,2,4-cyclobutanetriol, 1,2,3,4-cyclobutanetetrol, 1,3-dimethyl-1,2,3,4-cyclobutanetetrol, 1-hydroxycyclobutanemethanol, 3-methyl-2,2-butanediol, 1,2-pentanediol, 1,3-pentanediol, 1,4-pentanediol, 2,3-pentanediol, 2,4-pentanediol, 1,2,3-pentanetriol, 1,2,4-pentanetriol, 2,3,4-pentanetriol, 1,1-oyclopentanediol, 1,2-cyclopentanediol, 1,3-cyclopentanediol, 1,2,3-cyclopentanetriol, 1,2-hexanediol, 1,3-hexanediol, 1,2,3-hexanetriol, 1,2,4-hexanetriol, 1,2,3,4-hexanetetrol, 1,1-cyclohexanediol, 1,2-cyclohexanediol, 1,4-cyclohexanediol, 1,2,4-cyclohexanetriol, 1,2,5-cyclohexanetriol, 1,2,3,4-cyclohexanetetrol, 1,2,3,5-cyclohexanetetrol, sorbitol, mannitol.

More preferred alcohols are cyclicetherpolyols having at least 6 carbon atoms, at least 2 hydroxyl groups, and at least 2 ether linkages. Even more preferred are cyclicetherpolyols having at least 15 carbon atoms, 5 ether linkages, and at least 2 hydroxyl groups, or at least 15 carbon atoms, at least 7 ether linkages, and at least 3 hydroxyl groups. Most preferred are cyclicetherpolyols having at least 18 carbon atoms, at least 6 hydroxyl groups, and at least 6 ether linkages. Molecular structures with significantly larger molecular weights than the above minimums have been found to be advantageous. Among the cyclicetherpolyols, monocyclicdietherdiols are preferred and polycyclicpolyetherpolyols (referred to hereinabove as PECP) are most preferred. "Poly" is used to mean two or more.

The alcohols or mixtures of alcohols useful in this invention should be soluble in the drilling fluid of this invention at the temperature and pressure conditions occurring in the wellbore or can be solubilized as described infra. Additionally, the alcohols or mixtures of alcohols should not precipitate or otherwise degrade under the actions of the ions in the drilling fluid (e.g., resistant to calcium and electrolytes) and the temperature and pressure conditions occurring during drilling. The alcohols may also be soluble at the ambient temperature and pressure conditions on the surface during the preparation of the drilling fluid of this invention. Some of the higher molecular weight alcohols may be very viscous liquids, or solids or have low solubility at the temperature conditions at the surface under which the drilling fluid is prepared. In these cases, the alcohols may be diluted with a suitable solvent which is soluble in the drilling fluid at the temperature conditions of drilling fluid preparation at the surface. Such suitable solvents may act to both lower viscosity and to increase solubility of the higher molecular weight alcohol for addition to the drilling fluid on the surface. Such solvents may be polyols of lower molecular weight, other alcohols such as methanol, ethanol, propanol, or isopropanol, water or mixtures of solvents and water.

The concentration of alcohol in the water phase when used in the preparation of the drilling fluid of this invention will generally be at least about 2% by weight and preferably from about 2 to about 30% by weight based on the water phase and more preferable from about 5 to about 15% by weight; excellent results have been obtained with concentrations between about 10 and about 20% by weight. Preferably at least about 1% w of the alcohol is cyclicetherpolyol or acyclic polyol, based on the total weight of the alcohol.

EXAMPLE 1

Tables 1-3 indicate the adverse effects of drilling fluid on Portland cement. There may be pockets of gelled drilling fluid beneath the primary cement which can interfere with the remedial cement.

TABLE I

| Effect of Drilling Fluid Contamination on Portland Cement Thickening Time | | |
|---|---|---|
| Drilling Fluid Type | Cement:Drilling Fluid Volumetric Ratio | Thickening Time Hours |
| Test Temperature: 172° F. | | |
| Oil external emulsion - with 30% (bw) calcium chloride brine as internal phase | 100:0 | 4.38 |
| | 95:5 | 3.65 |
| | 75:25 | 1.98 |
| | 50:50 | 1.8 |
| Test Temperature: 150° F. | | |
| Water base Lignosulfonate | 100:0 | 4.23 |
| | 95:5 | 5.66 |
| | 75:25 | 6.5+ |
| | 50:50 | 8+ |

TABLE 2

Effect of Drilling Fluid Contamination on Compressive Strength of Portland Cement

| Drilling Fluid Type | Cement:Drilling Fluid Volumetric Ratio | 24 Hr Compressive Strength, psi |
|---|---|---|
| *Test Temperature: 250° F.* | | |
| Oil external emulsion - with 30% (bw) calcium chloride brine as internal phase | 100:0 | 2514 |
| | 90:10 | 2230 |
| | 75:25 | 660 |
| *Test Temperature: 175° F.* | | |
| Water base Lignosulfonate | 100:0 | 3275 |
| | 95:5 | 2670 |
| | 75:25 | 1680 |
| | 50:50 | did not set |

TABLE 3

Effect of Drilling Fluid on Shear Bond Between Portland Cement and a Steel Surface

| Coating Material on Surface of Steel Rod | Shear Bond Strength psi |
|---|---|
| None - Clean steel surface | 170 |
| Water base drilling fluid | 55 |
| Water base spacer fluid | 80 |
| Oil base drilling fluid | 5 |
| Oil base spacer fluid | 25 |

EXAMPLE 2

Base Mud: Fresh water mud containing bentonite, chrome lignosulfonate, and low viscosity polyanionic cellulose.

300 lbs of hard burned magnesium oxide, under the trade name of "MAGCHEM 10 CR" by Martin Marietta Magnesia Specialties was added to weight the base mud up to 12.6 lbs/gal. Varying amounts of an ammonium polyphosphate solution were added to solidify the mud. The ammonium polyphosphate solution used is "POLY-N" sold by Arcadian Corporation and contains about 50 wt % ammonium polyphosphate. The results are described in the following table.

| Amount of Poly-N Added, % by volume of the mud | Resulting Density lbs/gal | Description of the resulting solid |
|---|---|---|
| 0 | 12.6 | Did Not Set |
| 25 | 12.4 | Set, resilient 50 psi after 4 hrs |
| 50 | 12.3 | Set, resilient 40 psi after 4 hrs |
| 100 | 12.2 | Set, resilient 30 psi after 4 hrs |

This example shows that solutions of polyphosphates can be used as diluents while also converting the drilling fluid into a solid.

EXAMPLE 3

Base Mud: Fresh water mud containing bentonite, chrome lignosulfonate, and low viscosity polyanionic cellulose.

300 lbs of hard burned magnesium oxide, under the trade name of "MAGCHEM 10 CR" by Martin Marietta Magnesia Specialties was added to weight the base mud up to 12.6 lbs/gal. Varying amounts of a monoammonium phosphate were added to solidify the mud. The results are described in the following Table.

| Amount of MAP Added, % by wt of MgO of the mud | Resulting Density lbs/gal | Description of the resulting solid |
|---|---|---|
| 0 | 12.6 | Did Not Set |
| 25 | 12.6 | Set, resilient 50 psi after 4 hrs |
| 50 | 12.7 | Set, resilient 250 psi after 2 hrs |
| 100 | 12.85 | Set, hard 510 psi after 2 hrs |

EXAMPLE 4

Base Mud: Fresh water mud containing bentonite, chrome lignosulfonate, and low viscosity polyanionic cellulose.

300 lbs of hard burned magnesium oxide, under the trade name of "MAGCHEM 10 CR" by Martin Marietta Magnesia Specialties was added to weight the base mud up to 12.6 lbs/gal. Varying amounts of a polyacrylic acid solution were added to solidify the mud. The polyacrylic acid had an average molecular weight of about 20,000 and is sold by PolySciences, Inc. The solution contained about 40 wt % polyacrylic acid. The results are described in the following Table.

| Amount of Polyacrylic Acid Added, % by volume of the mud | Resulting Density lbs/gal | Description of the resulting solid |
|---|---|---|
| 0 | 12.6 | Did Not Set |
| 25 | 11.9 | Set, resilient good adhesion to surfaces 40 psi after 4 hrs |
| 50 | 11.5 | Set, resilient good adhesion to surfaces 40 psi after 4 hrs |
| 100 | 10.9 | Set, highly pliable good adhesion to surfaces 10 psi after 4 hrs |

This Example shows that solutions of functional group-containing polymers can be used as diluents while also converting the drilling fluid into a solid.

EXAMPLE 5

Base Mud: Fresh water mud containing bentonite, chrome lignosulfonate, and low viscosity polyanionic cellulose.

300 lbs of hard burned zinc oxide, prepared in the laboratory by heating analytical grade zinc oxide at 1350° C. for 8 hours, cooling and grinding to pass through a 325 mesh screen, was added to weight the base mud up to 13.5 lbs/gal. Varying amounts of a polyacrylic acid solution were added to solidify the mud. The polyacrylic acid had an average molecular weight of about 50,000 and is sold by PolySciences, Inc. The solution contained about 25 wt % polyacrylic acid. The results are described in the following Table.

| Amount of Polyacrylic Acid Added, % by volume of the mud | Resulting Density lbs/gal | Description of the resulting solid |
|---|---|---|
| 0 | 13.5 | Did Not Set |
| 100 | 11.3 | Set, ductile 310 psi after 4 hrs |

EXAMPLE 6

Base Mud: Fresh water mud containing bentonite, chrome lignosulfonate, and low viscosity polyanionic cellulose.

300 lbs of hard burned magnesium oxide, under the trade name of "MAGCHEM 10 CR" by Martin Marietta Magnesia Specialties was added to weight the base mud up to 12.6 lbs/gal. Varying amounts of ethylene/acrylic acid copolymers were added by weight of the magnesium oxide. The copolymers used were "ACLYN" 540, 580, and 5120 sold by Allied Signal, Inc. These copolymers have low molecular weights and varying amounts of acrylic acid incorporated into the polymer. AC 540 has the lowest acrylic acid content and AC 5120 has the highest acrylic acid content.

Each mixture was heated to a temperature above the melting point of the coplymer and held at that temperature for 24 hours. The average melting point temperature for each of these copolymers was about 100° C. After 24 hours the samples were cooled and extracted from the molds. Each had set to form a cohesive solid having compressive strengths between 50 and 700 psi. All samples were ductile and good adhesion to metal surfaces.

EXAMPLE 7

Base Mud: Fresh water mud containing bentonite, chrome lignosulfonate, and low viscosity polyanionic cellulose.

350 lbs of blast furnace slag sold under the trade name of "NEWCEM" by Blue Circle Cement Company was added to weight the mud to lbs/gal. An equal volume amount of a polyacrylic acid solution were added to solidify the mud. The polyacrylic acid had an average molecular weight of about 50,000 and is sold by PolySciences, Inc. The solution contained about 25 wt % polyacrylic acid. The results are described in the following Table.

| Amount of Polyacrylic Added, % by volume of the mud | Resulting Density lbs/gal | Description of the resulting solid |
|---|---|---|
| 0 | 12.6 | Did Not Set |
| 100 | 10.9 | Set, ductile 130 psi after 4 hrs |

What is claimed is:

1. A method for repairing defective primary cement which includes forcing a cementitious slurry through holes or splits and/or filling such holes or splits in the primary cement comprising:
preparing the cementitious slurry comprising:
(a) a proton acceptor metal compound and
(b) one of a polymer component of the formula:

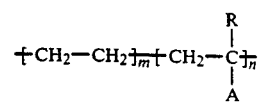

wherein A is

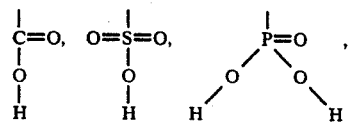

or a mixture of

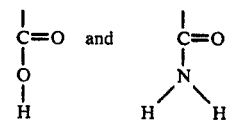

and wherein R is H or a 1–10 carbon atom alkyl radical and the ratio of m to n is within the range of 0:1 to 100:1;
(c) a water source selected from water, brine, seawater, water base drilling fluid, and water emulsion drilling fluid;
displacing the slurry through said holes or splits; and allowing the slurry to solidify to a remedial cement in situ.

2. The method of claim 1 wherein the remedial cement performs at least one of the following:
(1) repair a failed primary cement;
(2) eliminate water intrusion from above, below or within a hydrocarbon-producing zone;
(3) reduce a producing gas-to-oil ratio by isolating gas zones from adjacent oil intervals;
(4) repair casing leaks due to a corroded or split pipe;
(5) plug all or part of one or more zones in a multizone injection well; and
(6) plug and abandon a depleted or watered-out producing zone.

3. A method for repairing defective primary cement which includes forcing a cementitious slurry through holes or splits and/or filling such holes or splits in the primary cement, comprising:
preparing a cementitious slurry comprising
(a) blast furnace slag having a polydispersed particle size distribution by grinding a portion of the slag to an ultrafine category and grinding the remainder of the slag more coarsely; and
(b) a water source selected from water, brine, seawater, water base drilling fluid, and water emulsion drilling fluid;
displacing the slurry through said holes or splits; and allowing the slurry to solidify to a remedial cement in situ.

4. The method of claim 3 wherein said blast furnace slag has a polydispersed particle size distribution exhibiting at least two nodes on a plot of particle size versus percent of particles in that size.

* * * * *